Nov. 5, 1929.  F. W. EPPERSON  1,734,765
CONFECTIONERY MAKING APPARATUS
Filed Aug. 12, 1924   2 Sheets-Sheet 1
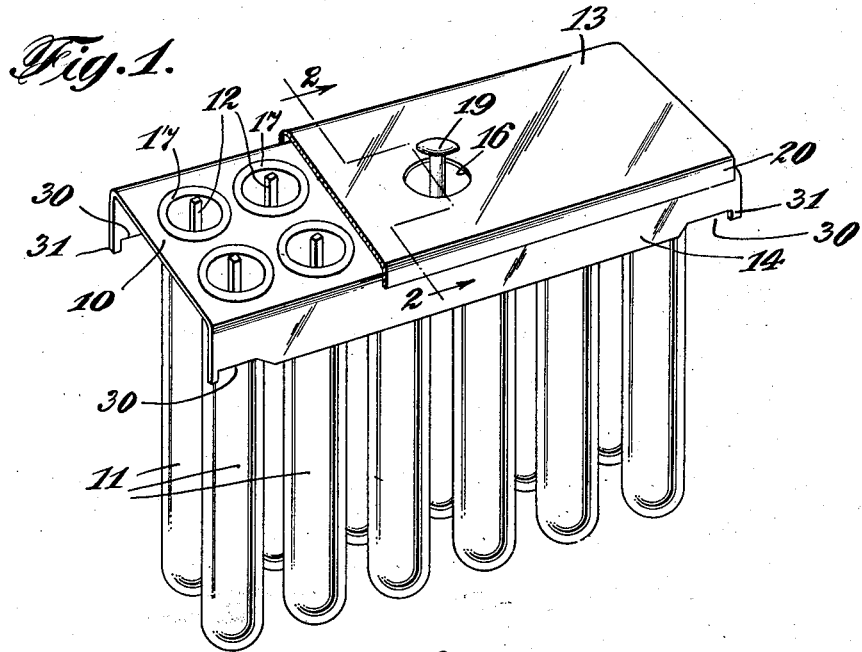
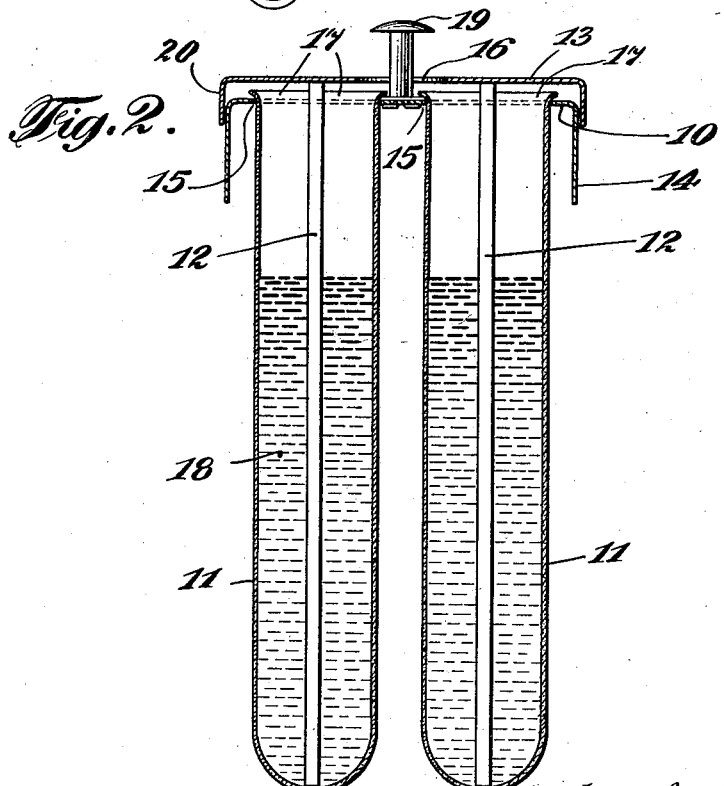
INVENTOR
Frank W. Epperson
BY
Dean, Fairbanks, Obright & Hirsch
ATTORNEYS

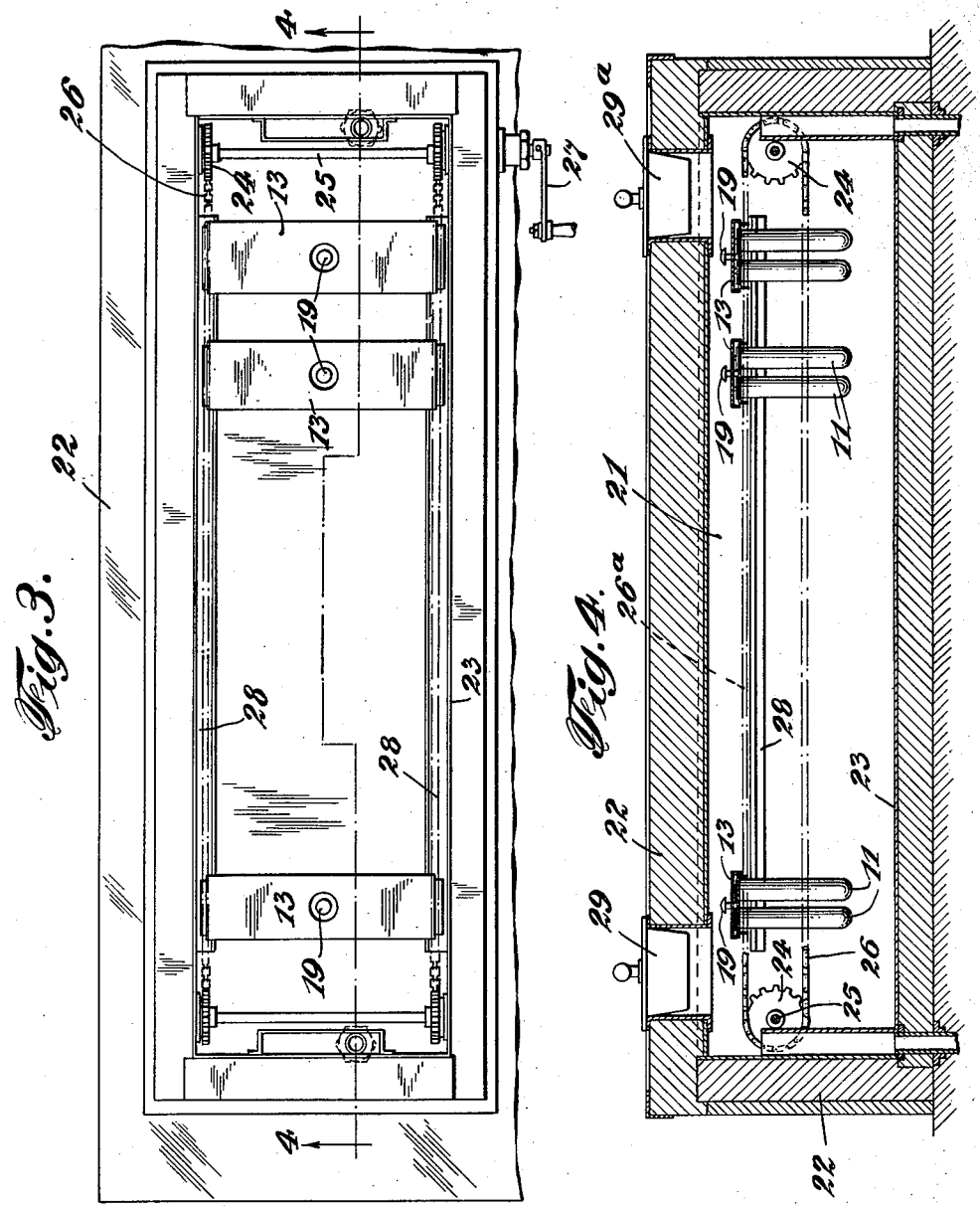

Patented Nov. 5, 1929

1,734,765

UNITED STATES PATENT OFFICE

FRANK W. EPPERSON, OF OAKLAND, CALIFORNIA

CONFECTIONERY-MAKING APPARATUS

Application filed August 12, 1924. Serial No. 731,564.

The invention relates to improved means for molding frozen confections and has among its objects, to provide a simple, efficient and reliable apparatus, compact in construction and readily operable to form or mold the confections in individual portions, in which they are frozen under sanitary conditions.

The apparatus of the present invention is particularly applicable for molding confections which are in the nature of frozen lollipops, comprising edible bodies of material frozen solidly upon sticks which serve as handles and permit the confections to be eaten without soiling the hands.

A preferred embodiment of the invention includes a rack or tray by which are carried, preferably by suspension, a number of molds charged with the material to be frozen in which the handles are immersed. Preferably means is associated with the rack for depressing the sticks or handles which would otherwise tend to float in the liquid charged molds. The mold supporting rack or tray preferably includes means for engagement and coaction with a stationary track along which the rack may be moved through a freezing chamber by a conveyor, preferably manually actuated from a crank to effect the movement of the racks along the guide-ways.

The racks, molds and stick-retaining means need not be mechanically secured together and can, accordingly, be readily assembled or disassembled. Preferably the rack is a metal plate having a number of apertures in which are hung the molds, which may be ordinary test tubes. The means for holding the sticks down in the test tubes may comprise a plate resting by its own weight on the upper ends of the sticks. The invention will be better understood from the accompanying drawings wherein:—

Fig. 1 is a perspective view of my improved molding apparatus, part being broken away and in section for clearness, Fig. 2 is a view in transverse section taken along the line 2—2 of Fig. 1, Fig. 3 is a view through a freezing chamber with the cover removed, showing the way in which the molding apparatus is supported and conveyed through the chamber, and;

Fig. 4 is a section taken along the line 4—4 of Fig. 3.

My improved molding apparatus includes the mold rack 10, molds 11, sticks 12 and plate 13 for forcing the sticks into the lower ends of the molds. The mold supporting rack may comprise a plate of relatively thin gauge sheet metal, generally rectangular in shape, formed at its longer sides with downwardly turned flanges 14 lending rigidity to the plate and serving other purposes, which will appear more fully hereinafter. The body of the plate is formed with any appropriate number of rather closely spaced circular apertures 15. The molds 11 preferably comprise ordinary test tubes formed with flaring lips 17 at their open ends, said lips being adapted to rest on the edges of the openings 15 in the plate to suspend the tubes from the rack. The molds may be partially filled either prior to, or after the step of the process wherein they are hung from the rack, with the liquid material 18 to be frozen, and the wooden sticks or handles 12 of length slightly greater than the test tubes, are then inserted. The sticks are preferably of angular cross-section and of some rather porous sapless wood, preferably birch, bass, or poplar, to insure their solid freezing to and interlocking with the edible body of the confection. The natural tendency of the sticks will be to float upward away from the bottom of the test tubes and it is desirable that this tendency be corrected, to assure an intimate interlock of the stick with the entire length of the frozen confection. For this purpose, I employ a plate 13 of sheet metal of sufficient weight to hold all of the sticks against the bottoms of the tubes. This plate may be of relatively thin gauge material since no great weight is necessary to serve the purpose. It is formed with a central opening 16 receiving a handle or finger piece 19, rising from the top of the rack to facilitate handling of a filled rack, and is preferably provided with depending side flanges 20, embracing the flanges of the rack and preventing relative lateral movement of the plate and rack.

I have illustrated in Figs. 3 and 4, a preferred embodiment of freezing tank and rack conveying means, but for purposes of the present invention, the freezing chamber and conveyor might be of different construction. The freezing tank shown, is of general elongated rectangular shape, preferably formed of balsa wood or some other light heat-insulating material 22 and may be interiorly lined with sheet metal 23. A continuous circulation of cooled brine may be kept up in the freezing chamber in any convenient manner and by any conventional refrigerating apparatus. Pairs of sprocket wheels 24 journaled in opposite ends of the chamber on shafts 25 are connected by sprocket chains 26 and one of the shafts may be equipped with an exterior crank handle 27 for turning the wheels and shifting the chains. Preferably, the two chains are arranged closely adjacent the two side walls of the freezing chamber and each includes an upper run 26ª passing just above, or possibly resting upon, a horizontal track or guide-way 28. A trap door 29 near one end of the top of the freezing chamber permits the insertion of the racks which are removable through a similar trap door 29ª at the other end after they have travelled the length of the chamber. It will be noted that the side flanges 14 of the tube supporting racks are cut-away adjacent their ends as at 30 and terminate in downwardly presented feet 31. These feet are adapted to rest upon the stationary guideways 28 within the freezing chamber, the racks being preferably disposed crosswise of such chamber so that a relatively large number of them may be accommodated at one time. As the racks are lowered through the inlet opening in the cover of the freezing chamber onto the guide-ways or rails, the feet will pass through the links of the sprocket chains and the sprocket chains will serve as the conveyor means for sliding the racks along the guide-ways from one end of the tank to the other. The construction set forth maintains the racks against cocking in their travel through the freezing tank, so that they will not become jammed even though the freezing tank is but slightly wider than the racks. Other expedients might be resorted to for coupling the racks to the conveyor chains or other appropriate actuating means for shifting them through the length of the tank, and the feet at the ends of the rack flanges might be shaped in various ways for proper engagement with different types of actuating means but the present construction is preferred. The conveyor chains might be power driven if desired, but in any case, it is preferred to insert a filled rack at trap 29, in the space afforded upon removal of a rack with the frozen confections from trap 29ª.

The plate 13, in addition to its function of holding down the sticks, serves to exclude dust and dirt and other foreign particles, such, for instance, as flake ice, which may collect on the roof of the freezing chamber and tend to fall into the molds. Although the molds have only a hanging connection with the rack, the mouths of the tubes and the outwardly flaring lips provide a sufficiently tight fit with the racks to effectively guard against the upward splashing of agitated brine into the test tubes. The open ends of the tubes are thus guarded, both above and below. The stationary guide-ways along which the mold carrying racks are shiftable are preferably disposed above the brine level in the tank, so that the racks and plates are not bathed in the briny solution but only the lower ends of the molds dip thereinto.

The fact that there are no mechanical connections between the various parts of the molding apparatus greatly expedites the disassembly of the parts for cleaning purposes, after a molding operation has been performed. It has been found in practice that few test tubes become broken in use. In any event, these tubes are comparatively cheap and, in fact, the cost of the entire molding apparatus is practically a negligible factor in the cost of producing the confections. The rack and plate may be cheaply stamped from sheet metal and cannot be warped or otherwise damaged by their repeated subjection to the dampness and low temperature of the freezing chamber.

It will thus be seen that there is herein described apparatus in which the several features of this invention are embodied, and which apparatus in its action attains the various objects of the invention and is well suited to meet the requirements of practical use.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

Having thus described my invention what I claim as new and desire to secure by Letters-Patent of the United States is:—

1. A mold rack including a flat plate having openings therein, wherein molds are adapted to be hung, flanges on the plate and feet at the ends of the flange engageable with conveyor chains to effect bodily movement of the rack.

2. Apparatus for molding frozen confections including a mold carrier and a plurality of molds supported thereby, each adapted to sustain a buoyant handle member disposed therein and about which the confection is adapted to be frozen, said handle members being weighted to prevent them from floating in the liquid.

3. Apparatus for molding frozen confections including a mold carrier and a plurality of molds supported thereby, each adapted to sustain a buoyant handle member disposed therein and about the lower end of which the confection is adapted to be frozen and means engaging the unimmersed upper ends of the handles and pressing the handles downwardly against the bottom of the molds.

4. Apparatus for molding frozen confections including a mold rack and a plurality of molds supported thereby, each adapted to sustain a buoyant handle member disposed therein and about which the confection is adapted to be frozen, and a weight resting on the handles and holding them against the bottoms of the molds.

5. Apparatus for molding frozen confections including a mold tray and a plurality of molds hung therefrom, each adapted to sustain a buoyant handle member disposed therein and about which the confection is adapted to be frozen, and a plate resting on the upper ends of the handles, and preventing them from floating upwardly in the molds.

6. Apparatus for molding frozen confections including a mold rack, a plurality of molds hung therefrom, each adapted to sustain a buoyant handle member disposed within and extending above the edges of the molds, a plate resting on the handle members to retain the same against the bottoms of the molds, a handle on the tray, said plate having an opening therein accommodating said handle.

7. A mold tray including a flat plate, depending marginal flanges at opposite sides of the plate tending to strengthen the same, molds suspended from the plate, each adapted to sustain a handle member therein, a second plate resting on the upper ends of the handles to prevent flotation of the same within the molds, and flanges on the last mentioned plate embracing the flanges of the first-mentioned plate.

8. A mold tray including a flat plate, depending marginal flanges at opposite sides of the plate tending to strengthen the same, molds suspended from the plate, each adapted to sustain a handle member therein, a second plate resting on the upper ends of the handles and preventing flotation of the same within the molds, flanges on the last mentioned plate embracing the flanges of the first mentioned plate, a finger piece projecting upwardly from the first mentioned plate, said second mentioned plate having an opening therein through which the handle extends.

9. A mold tray including a flat metal plate, depending marginal flanges at opposite sides of the plate tending to strengthen the same, molds suspended from the plate, each adapted to sustain a handle member therein, a second plate to rest on the upper ends of the handles and preventing flotation of the same within the molds, flanges on the last mentioned plate embracing the flanges of the first mentioned plate, said first mentioned flanges including cut-away portions defining feet at the ends of the flanges engageable with conveyor chains to effect bodily shifting of the mold tray through a refrigerating chamber.

10. Apparatus for molding frozen confections comprising a generally flat flanged sustaining member adapted to be supported near its edges above a refrigerating medium, a plurality of parallel tiers of elongated tubular cylindrical molds extending through corresponding openings in said sustaining plate, each adapted to sustain a buoyant handle member disposed therein and about the lower end of which the confection is adapted to be frozen, said molds having supporting flanges overlapping the edges of said openings whereby the plate carries the molds in suspended relation, for the lengths thereof to extend into a refrigerating medium therebelow, and in parallel spaced relation for ready access of the refrigerating medium to the entire surface of the wall enclosing the material to be frozen and means whereby the handle sticks are retained substantially in engagement with the bottoms of the molds during refrigeration.

Signed at Oakland in the county of Alameda and State of California this 6th day of August A. D. 1924.

FRANK W. EPPERSON.